United States Patent [19]

Itou et al.

[11] Patent Number: 5,764,400
[45] Date of Patent: Jun. 9, 1998

[54] OPTICAL MODULATOR

[75] Inventors: Tomoyuki Itou; Hisashi Takamatsu; Toshihiro Otani, all of Sapporo; Yoshinobu Kubota; Yasuhiro Omori, both of Kawasaki, all of Japan

[73] Assignee: Fujitsu Ltd., Kawasaki, Japan

[21] Appl. No.: 803,377

[22] Filed: Feb. 20, 1997

[30] Foreign Application Priority Data

Sep. 5, 1996 [JP] Japan .................. 8-235451

[51] Int. Cl.$^6$ .................. H01S 3/00; G02F 1/0135
[52] U.S. Cl. .................. 359/245; 385/2; 385/3
[58] Field of Search .................. 359/245; 385/2, 385/3, 35, 48

[56] References Cited

U.S. PATENT DOCUMENTS

| | | | |
|---|---|---|---|
| 4,983,009 | 1/1991 | Musk | 350/96.18 |
| 5,259,044 | 11/1993 | Isono et al. | 385/2 |
| 5,357,590 | 10/1994 | Aucacher | 385/33 |
| 5,394,493 | 2/1995 | Ames | 385/35 |

FOREIGN PATENT DOCUMENTS 3-145623  6/1991  Japan .

*Primary Examiner*—Mark Hellner
*Attorney, Agent, or Firm*—Staas & Halsey

[57] ABSTRACT

Disclosed herein is an optical modulator module including an optical waveguide structure of a Mach-Zehnder type, for example, an electrode for switching a coupling mode where an output beam is obtained from the optical waveguide structure and a leakage mode where a leakage beam deflects from the optical waveguide structure, a photodetector having a photodetecting surface for receiving the leakage beam, and a mechanism for converting a beam parameter of the leakage beam so as to prevent close contact of the photodetecting surface with the optical waveguide structure. The optical modulator module allows monitoring of optical power by the use of the leakage beam and is improved in manufacturability.

18 Claims, 11 Drawing Sheets

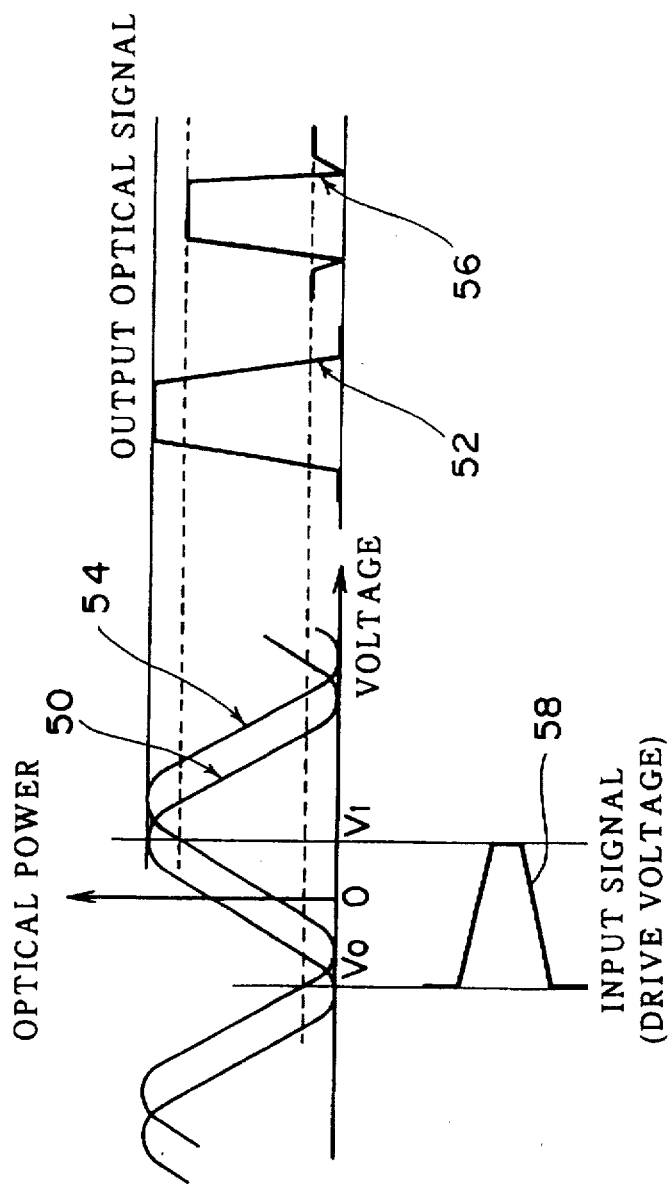
F I G. 5

5,764,400

1

OPTICAL MODULATOR

BACKGROUND OF THE INVENTION

1. Field of the Invention

The present invention relates generally to an optical modulator for modulating light from a light source, and more particularly to a structure of the optical modulator for monitoring optical power.

2. Description of the Related Art

In an optical fiber communication system, a modulation rate has been increased. In direct intensity modulation of a laser diode, wavelength chirping is a problem. The chirping causes waveform distortion when an optical signal passes through an optical fiber having chromatic dispersion (wavelength dispersion). From a standpoint of fiber loss, the most desirable wavelength to be applied to a silica fiber is 1.55 μm. At this wavelength, a normal fiber has a chromatic dispersion of about 18 ps/km/nm, which limits a transmission distance. To avoid this problem, an optical modulator to be used for external modulation has increasingly been expected.

As a practical external modulator, a Mach-Zehnder type optical modulator (LN modulator) using a LiNbO$_3$ substrate has been developed. Carrier light having a constant intensity from a light source is supplied to the LN modulator, in which a switching operation using interference of light is carried out to obtain an intensity-modulated optical signal.

The LN modulator has an often pointed-out defect that it causes operation point drift. To cope with the operation point drift, the power of light output from the LN modulator is monitored, and control for operation point stabilization is carried out according to an electrical signal obtained as the result of this monitoring.

The monitoring of the power of light output from an optical modulator may be effected by branching a part of the output light by a beam splitter and receiving a resultant branched beam by a photodetector. In this case, however, the power of an optical signal output from the optical modulator becomes small, and the number of parts is increased to cause an increase in size of the device.

In view of this problem, it has been tried to use a leakage beam generated upon interference for the monitoring of optical power (Japanese Patent Laid-open No. 3-145623). However, in the conventional monitoring technique using the leakage beam, a photodetecting surface of a fiber end face for receiving the leakage beam is mounted directly on an end surface of an optical modulator chip. Accordingly, the chip is prone to breakage, causing a difficulty of manufacture of the optical modulator.

SUMMARY OF THE INVENTION

It is therefore an object of the present invention to provide an optical modulator which is improved in manufacturability and allows monitoring of optical power by the use of a leakage beam.

In accordance with an aspect of the present invention, there is provided an optical modulator for modulating light received by an input port and outputting modulated light from an output port. The optical modulator has an optical waveguide structure provided by a dielectric chip, for example. The optical waveguide structure has a first end and a second end operatively connected to the input port and the output port, respectively, a first Y-portion and a second Y-portion connected to the first end and the second end, respectively, and a first path and a second path connected between the first Y-portion and the second Y-portion. Driving means applies an electric field to at least one of the first path and the second path, so as to switch a coupling mode and a leakage mode to thereby output the modulated light from the second end. In the coupling mode, light passed through the second Y-portion is supplied to the second end, thereby switching on the light to be output from the optical modulator. In the leakage mode, the light passed through the second Y-portion deflects from the optical waveguide structure to generate a leakage beam, thereby switching off the light to be output from the optical modulator. In this manner, intensity modulation of the light received by the input port is carried out. The optical modulator further has a photodetector having a photodetecting surface for receiving the leakage beam and means for converting a beam parameter of the leakage beam so as to prevent close contact of the photodetecting surface with the optical waveguide structure. The beam parameter is a direction, polarized condition, or numerical aperture of the leakage beam.

According to the present invention, close contact of the photodetecting surface of the photodetector with the optical waveguide structure is prevented by the means for converting the beam parameter of the leakage beam.

Accordingly, the manufacturability of the optical modulator can be improved. Further, the coupling mode and the leakage mode are complementary to each other. Accordingly, optical power can be monitored by using the leakage beam.

In the case that the optical waveguide structure is provided by a dielectric chip, the driving means may include first and second electrodes respectively provided on the first and second paths on the dielectric chip. Preferably, a circuit for controlling an operation point according to an output signal from the photodetector is operatively connected to the first and second electrodes so that the coupling mode and the leakage mode are effectively switched to each other.

In this specification, the wording that an element and another element are operatively connected includes the case that these elements are directly connected, and also includes the case that these elements are so provided as to be related with each other to such an extent that an electrical signal or an optical signal can be mutually transferred between these elements.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5 is a graph for illustrating operation point drift;

DETAILED DESCRIPTION OF THE PREFERRED EMBODIMENTS

Some preferred embodiments of the present invention will now be described in detail with reference to the attached drawings.

Figure 1:
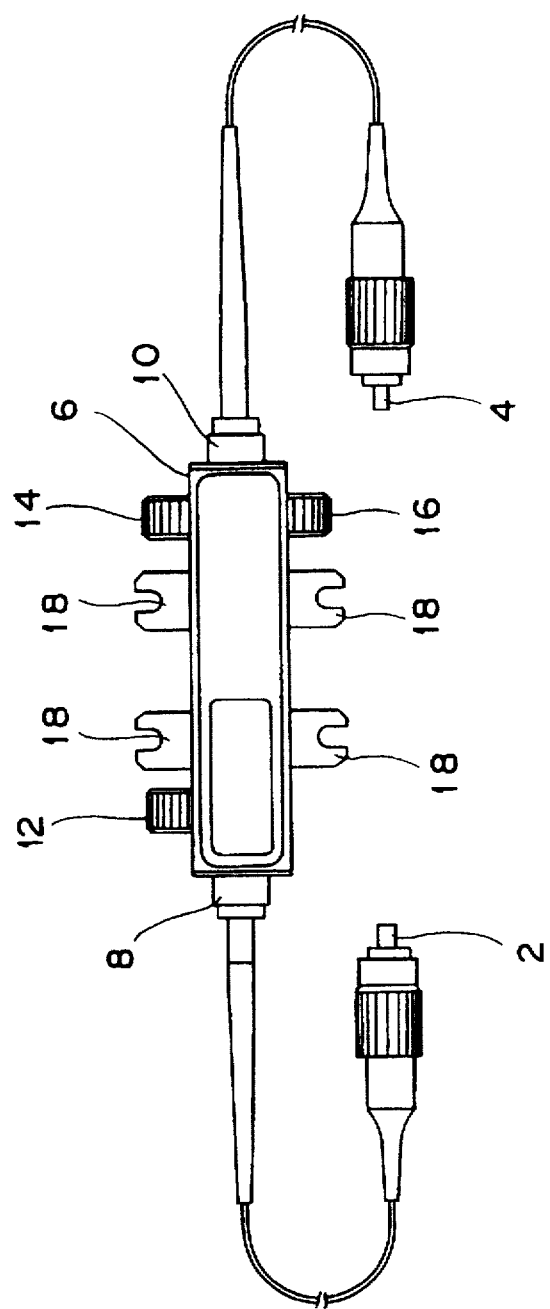
FIG. 1 is a plan view showing an external appearance of an optical modulator module to which the present invention is applied.

Referring to FIG. 1, there is shown an external appearance of an optical modulator module to which the present invention is applied. This module modulates light received by an input port 2 and outputs modulated light from an output port 4. In this preferred embodiment, each of the ports 2 and 4 is an optical connector. This module has a package 6 in which a modulator chip to be hereinafter described is contained. Pigtail type fiber assemblies 8 and 10 for respectively connecting the ports 2 and 4 to the package 6 are provided at opposite ends of the package 6. Connectors 12 and 14 for a high-speed signal are provided on one side surface of the package 6, and a connector 16 for a low-speed signal is provided on the other side surface of the package 6. Metal fittings 18 are fixed to the bottom of the package 6, so as to fix the package 6 to a case or the like not shown.

Figure 2:
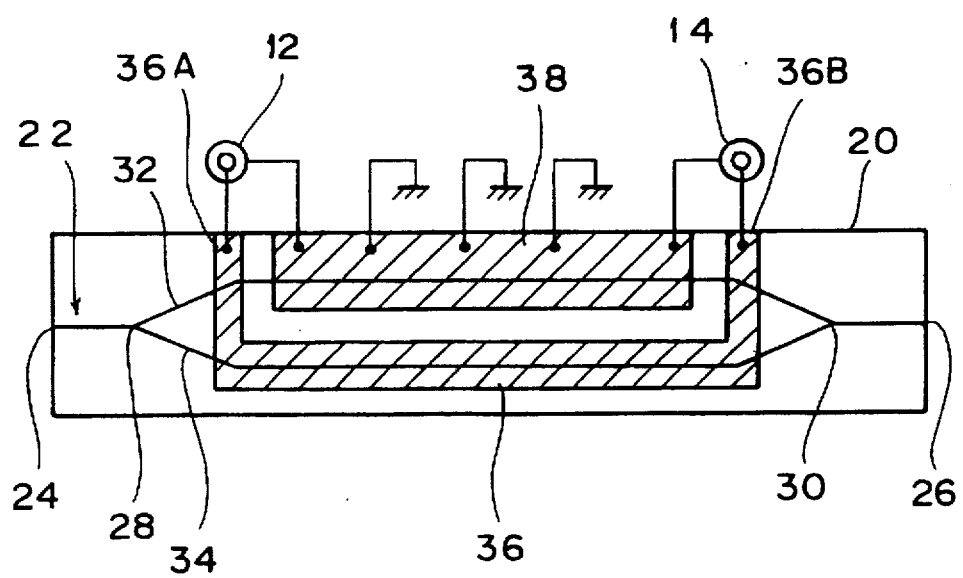
FIG. 2 is a plan view of a modulator chip contained in the module shown in FIG. 1.

Referring to FIG. 2, there is shown a modulator chip contained in the package 6 (see FIG. 1). This modulator chip has an optical waveguide structure 22 provided by a dielectric chip 20. The dielectric chip 20 is formed from $LiNbO_3$ (lithium niobate), for example. In this case, the optical waveguide structure 22 is obtained by thermal diffusion of Ti (titanium). The optical waveguide structure 22 has a first end 24 and a second end 26 respectively operatively connected to the input port 2 and the output port 4 shown in FIG. 1. The optical waveguide structure 22 further has a first Y-portion 28 and a second Y-portion 30 respectively connected to the first end 24 and the second end 26, and a first path 32 and a second path 34 connected between the Y-portions 28 and 30.

Light supplied to the first end 24 is branched into first and second beams equal in optical power to each other by the first Y-portion 28. The first and second beams are guided by the paths 32 and 34, respectively, and then interfere with each other at the second Y-portion 30. According to a phase difference between the first and second beams at the second Y-portion 30, switching is carried out between a coupling mode where an output beam is obtained at the second end 26 and a leakage mode where a leakage beam is emitted from the second Y-portion 30 into the dielectric chip 20.

To change the phase difference between the first and second beams, a grounded electrode 38 is provided on the first path 32, and a signal electrode 36 is provided on the second path 34. The signal electrode 36 is configured as a traveling wave type such that an input end 36A is connected to an internal conductor of the connector 12 and an output end 36B is connected to an internal conductor of the connector 14. Shields of the connectors 12 and 14 and the grounded electrode 38 are grounded through the package 6 (see FIG. 1), for example. The electrodes 36 and 38 are formed by vapor deposition of Au (gold), for example. Although not shown, a single or plural stabilizing buffer layers formed of Si and/or $SiO_2$ may be provided between the dielectric chip 20 and the electrodes 36 and 38.

Figure 3:
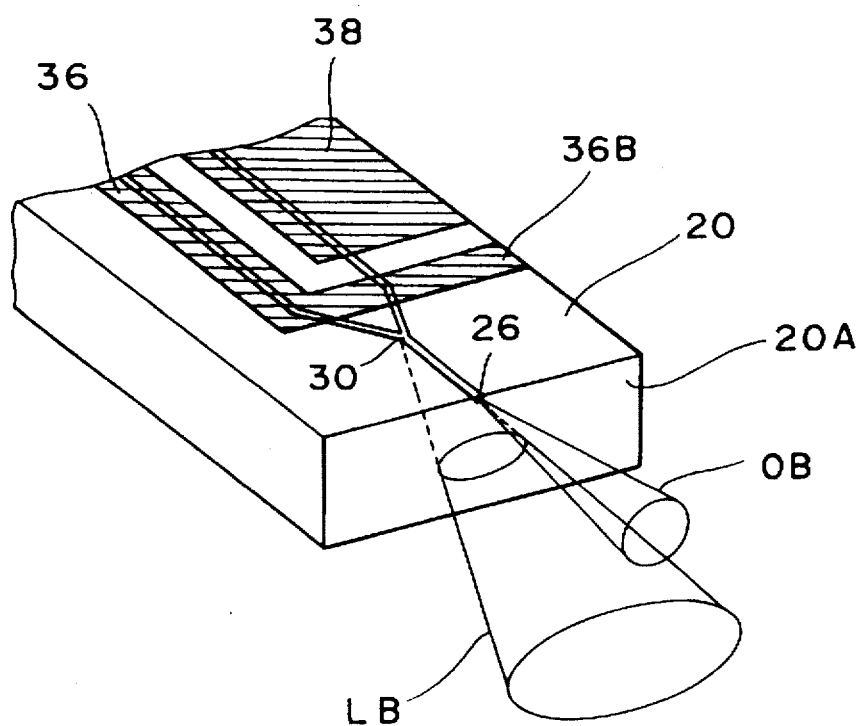
FIG. 3 is a cutaway perspective view of the modulator chip, for illustrating a leakage beam.

Referring to FIG. 3, there is shown a cutaway perspective view of the modulator chip 20 to illustrate the leakage beam in more detail. The chip 20 has an end surface 20A on substantially the same plane as that of the second end 26. A leakage beam LB emitted from the second Y-portion 30 into the chip 20 is further emitted from the end surface 20A into the air. An output beam OB generated as the result of interference in the Y-portion 30 is emitted from the second end 26 into the air.

Figure 4:
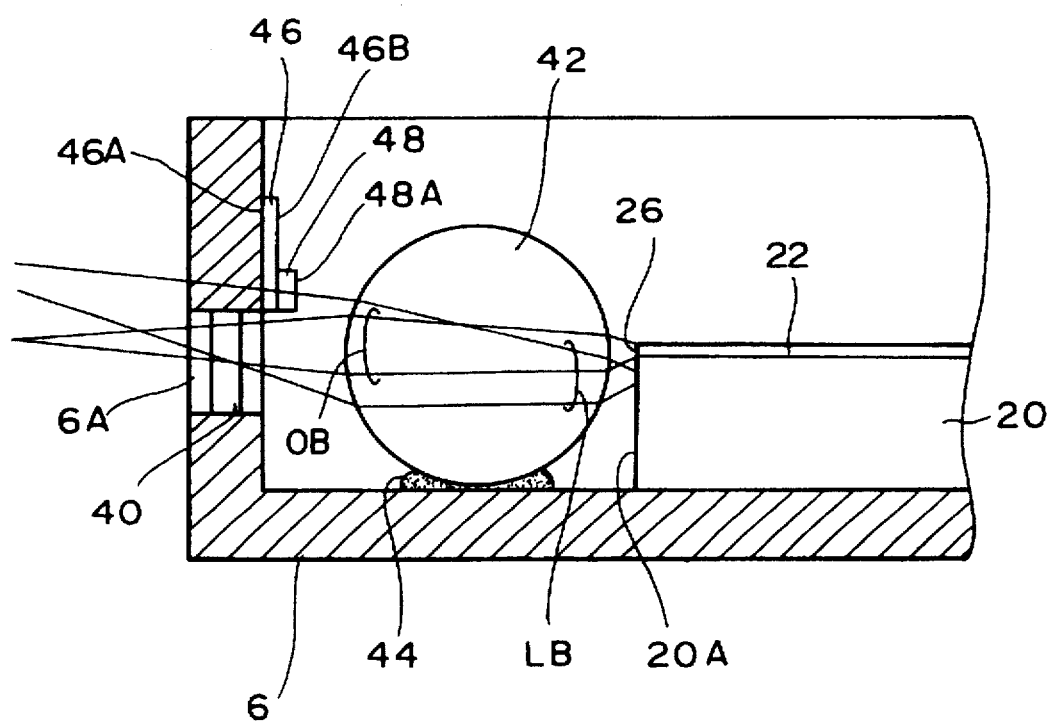
FIG. 4 is a fragmentary sectional view of an optical modulator module showing a first preferred embodiment for monitoring a leakage beam according to the present invention.

Referring to FIG. 4, there is shown a first preferred embodiment for monitoring the leakage beam LB. The dielectric chip 20 is fixed to the inner surface of the package 6. The package 6 has an opening 6A opposed to the second end 26, for emitting the output beam OB. The opening 6A is provided with a window member 40 formed of sapphire or the like, for hermetically sealing the interior of the package 6. A cover of the package 6 is not shown. A common lens 42 is provided between the chip 20 and the opening 6A to convert a beam parameter of the leakage beam LB emitted from the end surface 20A of the chip 20. In this preferred embodiment, the common lens 42 is a spherical lens, which is fixed to the inner surface of the package 6 by an adhesive 44. The output beam OB emitted from the second end 26 is converged by the common lens 42 to pass through the window member 40 and then guided to the output port 4 (see FIG. 1).

A photodetector (e.g., photodiode) 48 is provided on the inner surface of the package 6 through a ceramic substrate 46 at a position just above the opening 6A. A bottom surface 46A of the ceramic substrate 46 is fixed to the inner surface of the package 6, and the bottom of the photodetector 48 is fixed to a top surface 46B of the ceramic substrate 46. The photodetector 48 has a photodetecting surface 48A at the top. The leakage beam LB emitted from the end surface 20A of the chip 20 is converged by the common lens 42 to enter the photodetecting surface 48A of the photodetector 48.

The reason why the leakage beam LB can be monitored without hindering the output beam OB by using the single common lens 42 is that the output beam OB and the leakage beam LB are emitted from different points on the chip 20. The size of the common lens 42 is set so that the optical axis of the output beam OB substantially coincides with the center of the common lens 42. Accordingly, the leakage beam LB obliquely enters the common lens 42 from a position below the center of the common lens 42, so that a part or the whole of the leakage beam LB can be received by the photodetector 48 located above the opening 6A.

According to this preferred embodiment, at least a part of the leakage beam LB overlaps the photodetecting surface 48A of the photodetector 48, thereby allowing monitoring of optical power. Accordingly, positioning or the like of the photodetector 48 can be easily performed, and the module can therefore be simply manufactured. Further, nothing is required to be fixed to the end surface 20A of the chip 20, so that breakage of the chip 20 can be prevented to improve the yield.

The photodetector 48 is electrically connected to the connector 16 for the low-speed signal shown in FIG. 1. This connection is made by the following method, for example. A conductor pattern (not shown) is formed on the top surface 46B of the ceramic substrate 46. This conductor pattern is connected to an output terminal of the photodetector 48 by a bonding wire. The conductor pattern is connected to the connector 16 by a suitable lead wire. According to such a connection form, a photodetector assembly can be preliminarily configured by carrying out mechanical fixing and electrical connection of the photodetector 48 to the ceramic substrate 46 by means of soldering, for example, and this assembly can be fixed to the inner surface of the package 6. Accordingly, the module can be easily assembled.

Operation point drift will now be described with reference to FIG. 5. In a Mach-Zehnder type optical modulator employing a dielectric chip, an operation characteristic curve is drifted by a temperature change or aged deterioration in general (operation point drift). In FIG. 5, reference numerals 50 and 52 denote an operation characteristic curve and an output optical signal waveform, respectively, in the case that no operation point drift occurs, and reference numerals 54 and 56 denote an operation characteristic curve and an output optical signal waveform, respectively, in the case that the operation point drift occurs. Reference numeral 58 denotes a waveform of an input signal (drive voltage).

The operation characteristic curve is represented as a periodic change in optical power (e.g., total power of the output beam OB shown in FIG. 3) with an increase in voltage. Accordingly, by using voltages $V_0$ and $V_1$ respectively providing a minimum value and a maximum value of the optical power, respectively corresponding to two logical values of the input signal to thereby perform effective switching of the coupling mode and the leakage mode mentioned above, efficient binary modulation can be performed.

When the voltages $V_0$ and $V_1$ are constant upon occurrence of the operation point drift, an extinction ratio of the output optical signal is degraded as shown by reference numeral 56 by the periodicity of the operation characteristic curve. Accordingly, when the operation point drift occurs in an amount of dV, the voltages $V_0$ and $V_1$ must be changed to $(V_0+dV)$ and $(V_1+dV)$, respectively, thereby compensating for the operation point drift.

In the present invention, monitoring of the leakage beam can be applied to stabilization control of the operation point drift.

Figure 6:
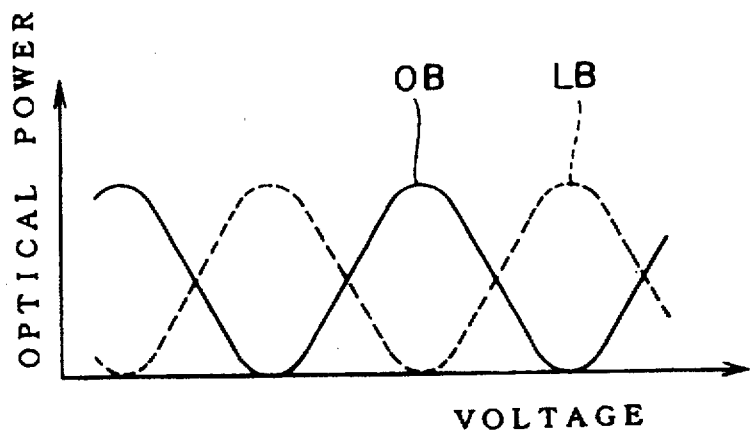
FIG. 6 is a graph showing an operation characteristic of the modulator chip.

Referring to FIG. 6, there is shown an operation characteristic of the modulator chip shown in FIG. 2. The sum of an optical power of the output beam OB and an optical power of the leakage beam LB for a given arbitrary voltage is constant. That is, the output beam OB and the leakage beam LB are complementary to each other. Accordingly, in an operative condition of the modulator chip shown in FIG. 2, an average optical power of the output beam OB is reflected on an average optical power of the leakage beam LB.

Figure 7:
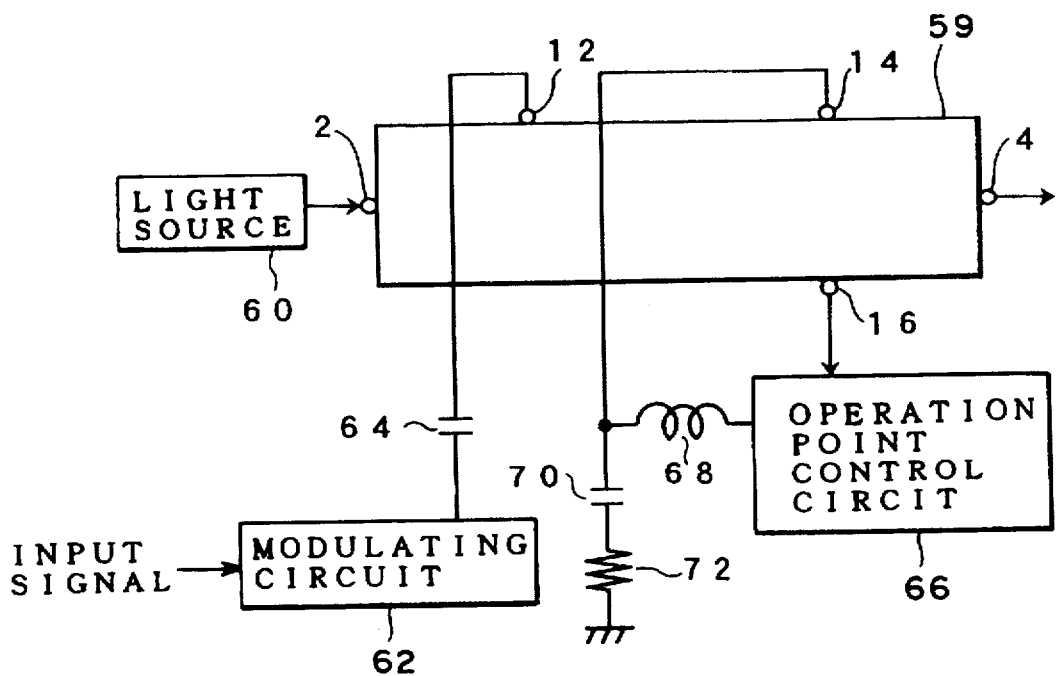
FIG. 7 is a block diagram of an optical transmitter to which the optical modulator module according to the present invention is applied.

Referring to FIG. 7, there is shown an optical transmitter having an optical modulator module 59 according to the present invention. Carrier light having a constant intensity from a light source 60 such as a laser diode is supplied to the input port 2. An modulating circuit 62 supplies a high-speed drive voltage signal (modulating signal) through a capacitor 64 to the connector 12 so that a phase change such that light output from the output port 4 is switched on/off according to a logical level of an input signal is given to the guided light in the optical paths 32 and 34 (see FIG. 2). An operation point control circuit 66 receives an output signal from the connector 16 corresponding to the power of the leakage beam, detects operation point drift according to the output signal, and generates a controlled DC bias voltage so that a phase change such that an operation point has a constant relation to an operation characteristic curve in accordance with the principle described in FIG. 5 is given to the guided light in the optical paths 32 and 34. The bias voltage is applied through an inductor 68 to the connector 14. A capacitor 70 and a terminating resistor 72 are connected in series to the connector 14, so as to high-frequency terminate the connector 14.

In this optical transmitter, the operation point of the optical modulator module 59 is always optimally stabilized, so that degradation or inversion of an output waveform due to the operation point drift can be prevented to thereby improve a transmission quality.

The operation point control circuit 66 may be composed of a circuit for superimposing a low-frequency signal from an oscillator on the high-speed modulating signal, a circuit for synchronously detecting the output signal from the connector 16 by using the low-frequency signal as a reference signal, and a circuit for controlling the bias voltage so that a DC signal obtained as the result of the synchronous detection becomes constant.

Figure 8:
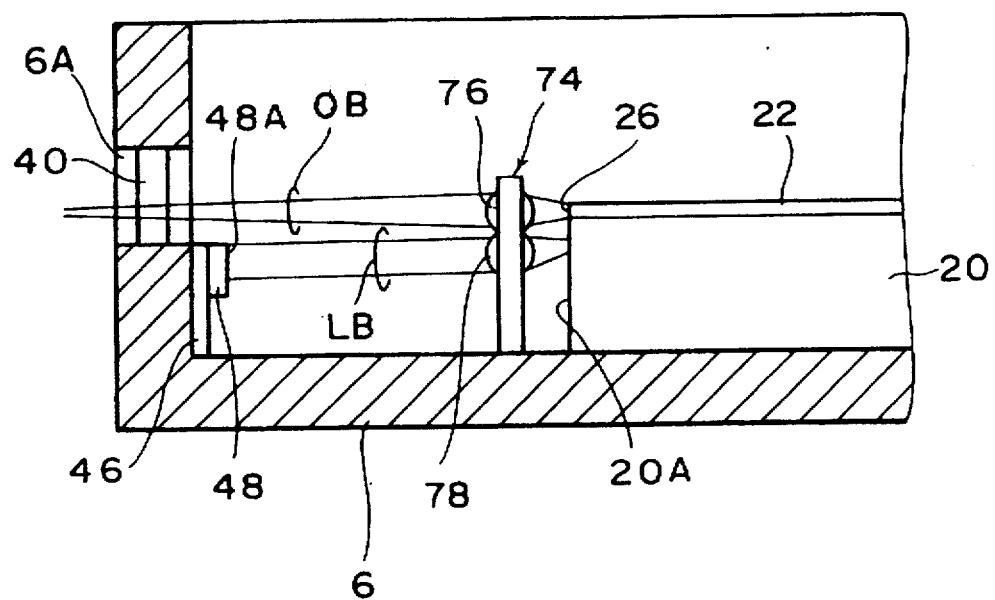
FIG. 8 is a fragmentary sectional view of an optical modulator module showing a second preferred embodiment for monitoring a leakage beam according to the present invention.

Referring to FIG. 8, there is shown a second preferred embodiment for monitoring the leakage beam LB according to the present invention. In contrast with the first preferred embodiment shown in FIG. 4, the second preferred embodiment is characterized in that an array lens 74 is used in place of the common lens 42. The array lens 74 is provided between the opening 6A of the package 6 and the dielectric chip 20, and is integrally formed with upper and lower lens elements 76 and 78. The output beam OB is converged by the lens element 76 to pass through the window member 40, and the leakage beam LB is converged by the lens element 78 to enter the photodetecting surface 48A of the photodetector 48. The photodetector 48 is fixed through the ceramic substrate 46 to the inner surface of the package 6 at a position just below the opening 6A.

In contrast with the first preferred embodiment shown in FIG. 4, the use of the array lens 74 eliminates the intersection of the optical axis of the output beam OB and the optical axis of the leakage beam LB between the opening 6A and the dielectric chip 20, thus making the optical axis substantially parallel to each other. Accordingly, a part or the whole of the leakage beam LB can be received by the photodetector 48 located below the opening 6A. The array lens 74 has a plurality of aspherical lenses fabricated by pressing, for example.

Figure 9:
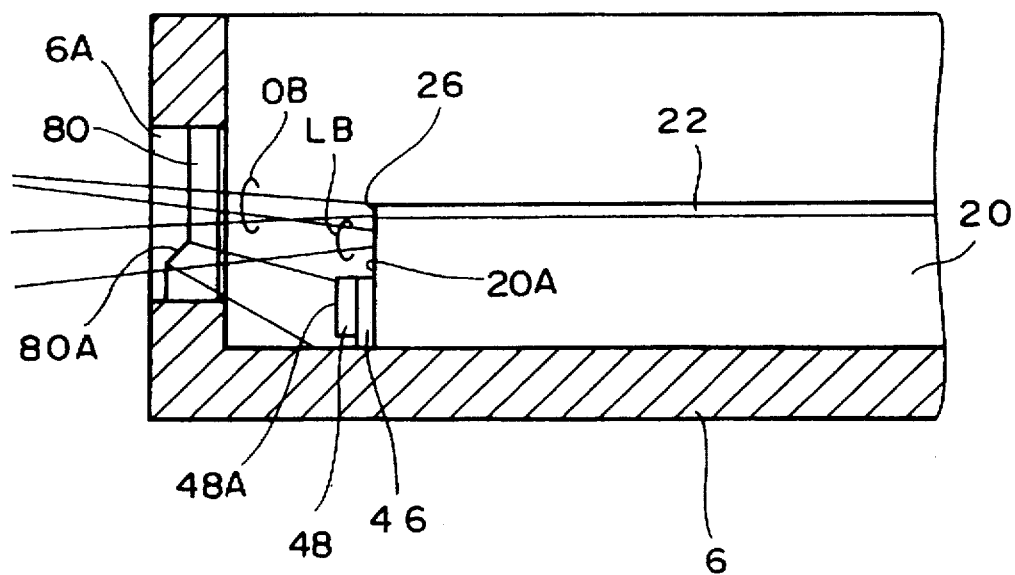
FIG. 9 is a fragmentary sectional view of an optical modulator module showing a third preferred embodiment for monitoring a leakage beam according to the present invention.

Referring to FIG. 9, there is shown a third preferred embodiment for monitoring the leakage beam LB according to the present invention. In this preferred embodiment, the opening 6A of the package 6 is closed by a window member 80 different in shape from the window member 40 in the first and second preferred embodiments. That is, the window member 80 has an inclined reflecting surface 80A for reflecting a part or the whole of the leakage beam LB. While the reflecting surface 80A is formed on the outside of the window member 80 as shown, the reflecting surface 80A may be formed on the inside of the window member 80. The photodetector 48 is fixed through the ceramic substrate 46 to the end surface 20A of the dielectric chip 20 in such a manner that the photodetecting surface 48A faces the side opposite to the end surface 20A.

In this preferred embodiment, any lens for converging the leakage beam LB is not used. However, since the photodetecting surface 48A of the photodetector 48 has a diameter of hundreds of μm, for example, a large part of the leakage beam LB can be received by the photodetector 48 by adjusting the relative positional relation between the Y-portion 30 (see FIGS. 2 and 3) and the end surface 20A of the dielectric chip 20 to reduce the aperture of the leakage beam LB (solid angle of radiation). Further, since the photodetecting surface 48A of the photodetector 48 faces the side opposite to the end surface 20A of the dielectric chip 20, it is unnecessary to consider possible flaws or the like on the end surface 20A in fixing the photodetector 48 and the ceramic substrate 46 to the dielectric chip 20, thereby improving the yield. In this preferred embodiment, a lens for converging the output beam OB is not provided in the package 6. This lens may be provided in the fiber assembly 10 shown in FIG. 1.

Figure 10:
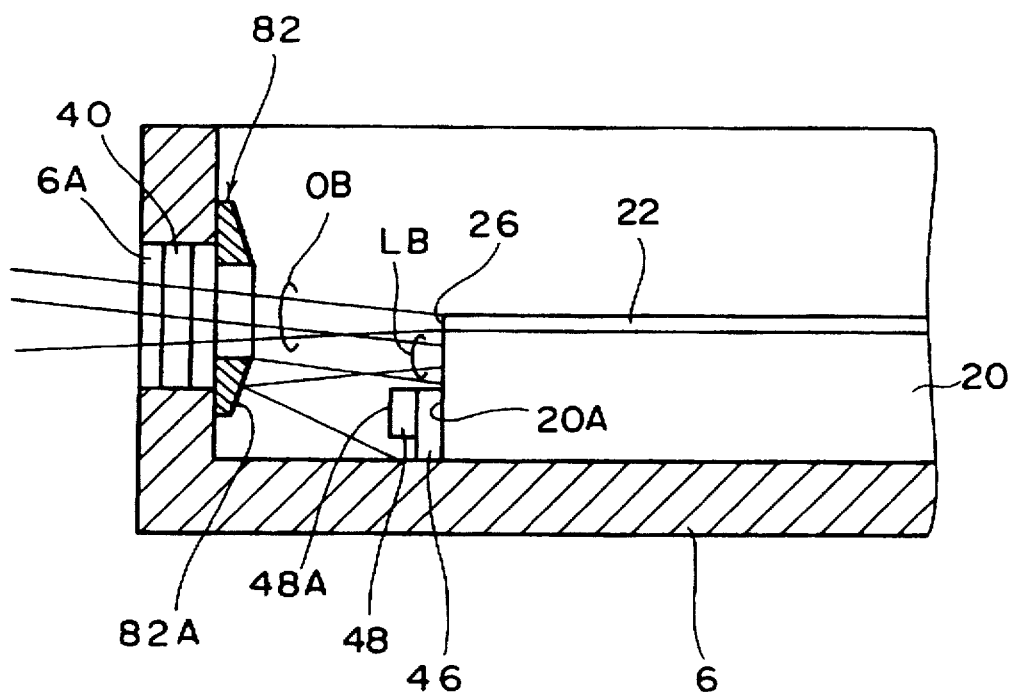
FIG. 10 is a fragmentary sectional view of an optical modulator module showing a fourth preferred embodiment for monitoring a leakage beam according to the present invention.

Referring to FIG. 10, there is shown a fourth preferred embodiment for monitoring the leakage beam LB according to the present invention. The window member 40 is the same as that used in the first and second preferred embodiments. A ring member 82 is fixed to the inner surface of the package 6 at a position along the opening 6A, so as to reflect a part or the whole of the leakage beam LB. The ring member 82 has a reflecting surface 82A forming a part of a substantially conical surface. The reflecting surface 82A is opposed to the dielectric chip 20. The output beam OB passes through the inside of the ring member 82 and through the window member 40, and a part or the whole of the leakage beam LB is reflected on the reflecting surface 82A to enter the photodetecting surface 48A of the photodetector 48. The arrangement of the photodetector 48 is the same as that in the third preferred embodiment.

Like the third preferred embodiment, a part or the whole of the leakage beam LB can be received by the photodetecting surface 48A facing the side opposite to the end surface 20A of the dielectric chip 20, thereby improving the yield. Further, the ring member 82 can be fabricated with high accuracy by a usual working method for metal, and can be easily fixed to the package 6, thus greatly facilitating the manufacturing of this module. The reflecting surface 82A may be obtained by polishing the surface of the ring member 82, or may be obtained by vapor deposition of a total reflecting film.

Figure 11:
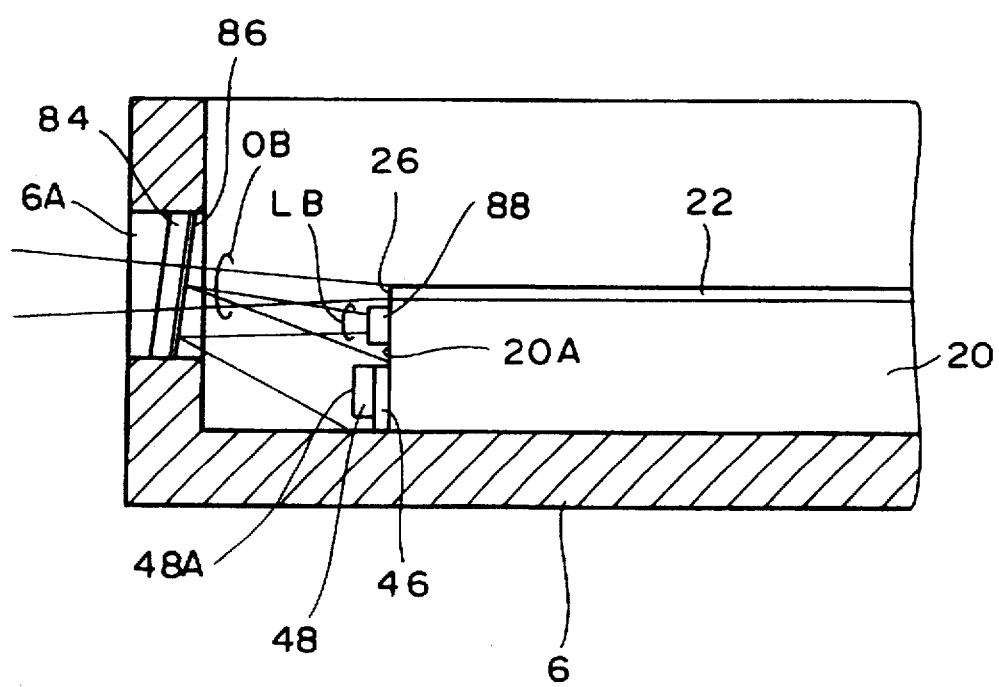
FIG. 11 is a fragmentary sectional view of an optical modulator module showing a fifth preferred embodiment for monitoring a leakage beam according to the present invention.

Referring to FIG. 11, there is shown a fifth preferred embodiment for monitoring the leakage beam LB according to the present invention. In this preferred embodiment, a window member 84 inclined at its upper portion inward of the package 6 is provided in the opening 6A of the package 6. An optical film 86 for reflecting a beam having a specific plane of polarization is laminated on the window member 84. While the optical film 86 is laminated on the inside of the window member 84 as shown, the optical film 86 may be laminated on the outside of the window member 84.

In the case that the electrodes 36 and 38 (see FIG. 2) are formed on the upper surface of the dielectric chip 20 and an electric field is applied to the optical waveguide structure 22 in a vertical direction as viewed in FIG. 11, each of the output beam OB and the leakage beam LB is TM polarized light having a plane of polarization parallel to the sheet plane of FIG. 11 in general. In this preferred embodiment, to convert only the leakage beam LB into TE polarized light having a plane of polarization perpendicular to the sheet plane of FIG. 11, a half-wave plate 88 is fixed to the end surface 20A of the dielectric chip 20.

The optical film 86 has a characteristic of transmitting TM polarized light and reflecting TE polarized light. Accordingly, the output beam OB passes through the optical film 86 and the window member 84, and the leakage beam LB is reflected on the optical film 86. A part or the whole of the reflected leakage beam LB enters the photodetecting surface 48A of the photodetector 48. The photodetector 48 is fixed through the ceramic substrate 46 to the end surface 20A of the dielectric chip 20 in such a manner that the photodetecting surface 48A faces the side opposite to the end surface 20A. Also according to this preferred embodiment, the photodetecting surface 48A of the photodetector 48 faces the side opposite to the end surface 20A of the dielectric chip 20, so that the yield can be improved.

Figure 12:
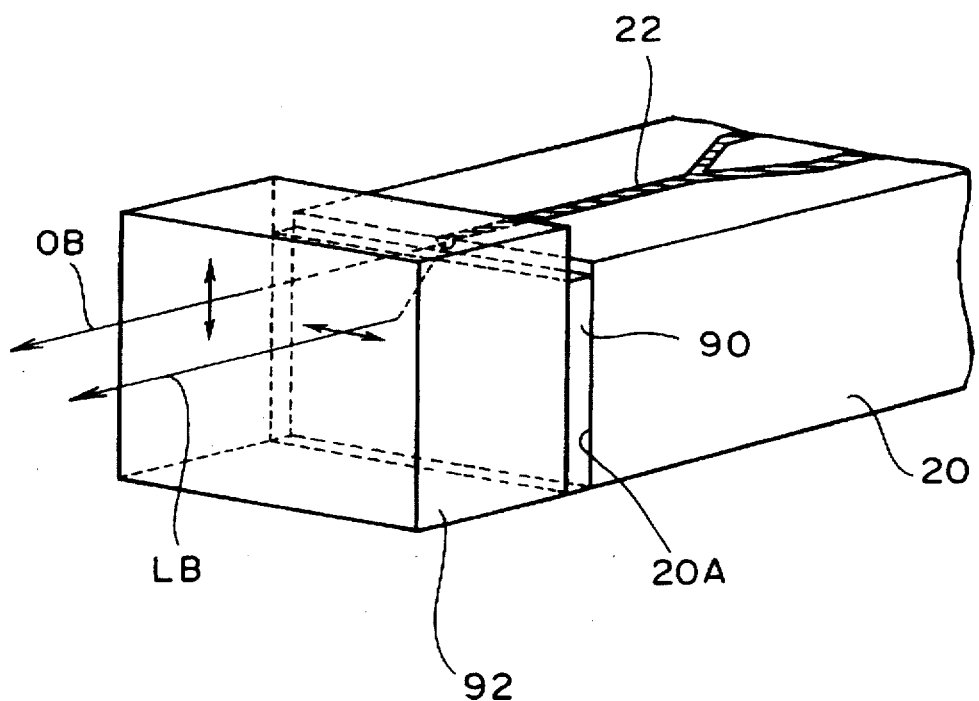
FIG. 12 is a fragmentary perspective view of an essential part of an optical modulator module showing a sixth preferred embodiment for monitoring a leakage beam according to the present invention.

Referring to FIG. 12, there is shown a sixth preferred embodiment for monitoring the leakage beam LB according to the present invention. In this preferred embodiment, the means for converting the beam parameter of the leakage beam LB includes optical rotating means for rotating 90° the plane of polarization of any one of the output beam OB and the leakage beam LB, and a birefringent crystal 92 for separating an optical path of the leakage beam LB from an optical path of the output beam OB. More specifically, the optical rotating means is a half-wave plate 90 fixed to the end surface 20A of the dielectric chip 20, and the birefringent crystal 92 is located so that the leakage beam LB passed through the half-wave plate 90 becomes any one of an ordinary ray and an extraordinary ray.

In this preferred embodiment, the birefringent crystal 92 is formed of rutile. The leakage beam LB is converted into TE polarized light by the half-wave plate 90, and then separated as an extraordinary ray downward from the output beam OB in the birefringent crystal 92. According to this preferred embodiment, a distance between the output beam OB and the leakage beam LB can be increased, thereby facilitating the monitoring of the leakage beam LB. Alternatively, the output beam OB and the leakage beam LB may be horizontally separated from each other by suitably setting the direction of polarization of each beam, for example.

As described above, according to the present invention, it is possible to provide an optical modulator which is improved in manufacturability and allows monitoring of optical power by the use of a leakage beam.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical modulator for modulating light received by an input port and outputting modulated light from an output port, comprising:

an optical waveguide structure having a first end and a second end operatively connected to said input port and said output port, respectively, a first Y-portion and a second Y-portion connected to said first end and said second end, respectively, and a first path and a second path connected between said first Y-portion and said second Y-portion;

driving means for applying an electric field to at least one of said first path and said second path so that a coupling mode where light passed through said second Y-portion is supplied to said second end and a leakage mode where said light passed through said second Y-portion is deflected from said optical waveguide structure to generate a leakage beam are switched to each other, thereby outputting said modulated light from said second end;

a photodetector having a photodetecting surface for receiving said leakage beam; and means for converting a beam parameter of said leakage beam so as to prevent close contact of said photodetecting surface with said optical waveguide structure.

2. An optical modulator according to claim 1, wherein said optical waveguide structure is provided by a dielectric chip;

said driving means comprising first and second electrodes respectively provided on said first and second paths on said dielectric chip.

3. An optical modulator according to claim 2, further comprising means operatively connected to said first and second electrodes, for controlling an operation point according to an output signal from said photodetector so that said coupling mode and said leakage mode are effectively switched to each other.

4. An optical modulator according to claim 2, wherein said dielectric chip is formed from lithium niobate.

5. An optical modulator according to claim 2, wherein said dielectric chip has an end surface on substantially the same plane as that of said second end, said leakage beam being emitted from said end surface;

said optical modulator further comprising a package for containing said dielectric chip, said package having an opening opposed to said second end.

6. An optical modulator according to claim 5, wherein said converting means comprises a common lens provided between said dielectric chip and said opening;

said modulated light from said second end being converged by said common lens to pass through said opening;

said leakage beam being converged by said common lens to enter said photodetecting surface.

7. An optical modulator according to claim 6, wherein said photodetector is provided so that said photodetecting surface is located above said opening.

8. An optical modulator according to claim 5, wherein said converting means comprises an array lens provided between said dielectric chip and said opening, said array lens having first and second lens elements;

said modulated light from said second end being converged by said first lens element to pass through said opening;

said leakage beam being converged by said second lens element to enter said photodetecting surface.

9. An optical modulator according to claim 8, wherein said photodetector is provided so that said photodetecting surface is located below said opening.

10. An optical modulator according to claim 5, further comprising a ceramic substrate having a first surface to which said photodetector is fixed and a second surface fixed to said package or said dielectric chip.

11. An optical modulator according to claim 5, wherein said converting means comprises a window member for sealing said opening;

said window member having a first surface for transmitting said modulated light and a second surface for reflecting said leakage beam.

12. An optical modulator according to claim 11, wherein said photodetector is provided so that said photodetecting surface faces the side opposite to said end surface of said dielectric chip.

13. An optical modulator according to claim 5, wherein said converting means comprises a ring member fixed to said package along said opening;

said ring member having a reflecting surface forming a part of a substantially conical surface;

said modulated light from said second end passing through the inside of said ring member and said opening;

said leakage beam being reflected on said reflecting surface to enter said photodetecting surface.

14. An optical modulator according to claim 13, wherein said photodetector is provided so that said photodetecting surface faces the side opposite to said end surface of said dielectric chip.

15. An optical modulator according to claim 5, further comprising a window member for sealing said opening;

said converting means comprising a half-wave plate fixed to said end surface of said dielectric chip for rotating 90° a plane of polarization of said leakage beam, and an optical film laminated on said window member;

said leakage beam being reflected on said optical film to enter said photodetecting surface.

16. An optical modulator according to claim 15, wherein said photodetector is provided so that said photodetecting surface faces the side opposite to said end surface of said dielectric chip.

17. An optical modulator according to claim 1, wherein said converting means comprises optical rotating means for rotating 90° a plane of polarization of any one of said modulated light and said leakage beam, and a birefringent crystal for separating an optical path of said leakage beam from an optical path of said modulated light.

18. An optical modulator according to claim 17, wherein said optical waveguide structure is provided by a dielectric chip having an end surface on substantially the same plane as that of said second end;

said leakage beam being emitted from said end surface;

said optical rotating means comprising a half-wave plate fixed to said end surface;

said birefringent crystal being located so that said leakage beam passed through said half-wave plate becomes any one of an ordinary ray and an extraordinary ray.

* * * * *